United States Patent [19]
Kunugi

[11] Patent Number: 6,101,019
[45] Date of Patent: Aug. 8, 2000

[54] OPTICAL SCANNER USING MULTIPLE HALF MIRRORS TO COMBINE MULTIPLE OPTICAL BEAMS

[75] Inventor: Hiroyuki Kunugi, Kanagawa-ken, Japan

[73] Assignee: Kabushiki Kaisha Toshiba, Kawasaki, Japan

[21] Appl. No.: 09/208,000

[22] Filed: Dec. 9, 1998

[30] Foreign Application Priority Data

Jan. 22, 1998 [JP] Japan ................................ 10-9010669

[51] Int. Cl.⁷ .................................................. G02B 26/08
[52] U.S. Cl. .......................... 359/204; 347/241; 347/243
[58] Field of Search ........................... 359/204; 347/241, 347/243

[56] References Cited

U.S. PATENT DOCUMENTS 5,251,055  10/1993  Koide ...................................... 359/216
5,625,403   4/1997  Hazman ................................... 347/239
5,751,462   5/1998  Shiraishi et al. ........................ 359/204

FOREIGN PATENT DOCUMENTS 9-189872   7/1997  Japan .

*Primary Examiner*—Cassandra Spyrou
*Assistant Examiner*—Leo Boutsikaris
*Attorney, Agent, or Firm*—Foley & Lardner

[57] ABSTRACT

The multi-beam optical unit of the invention limits the number of reflection times by half mirrors to one time or below when a plurality of beams are combined into one and guided to a polygon mirror, so that an influence upon an image due to a positioning error of the half mirrors can be minimized. Besides, power of emitted beams can be made uniform by using the half mirrors having transmissivity and reflectance satisfying predetermined conditions regardless of the number of times that the beams penetrate the half mirrors. Thus, the service lives of a plurality of beam emitting sources can be made uniform, and maintainability can be improved.

7 Claims, 4 Drawing Sheets

OPTICAL SCANNER USING MULTIPLE HALF MIRRORS TO COMBINE MULTIPLE OPTICAL BEAMS

BACKGROUND OF THE INVENTION

The invention relates to a multi-beam optical unit which is used for a high-speed copy machine and forms an image by simultaneously emitting a plurality of beams.

An image forming apparatus using a laser optical system is considered to improve a speed of forming an image on a photo conductor by having a plurality of laser beam emitting sources for printing at a high speed and simultaneously guiding the laser beams emitted from these laser beam emitting sources onto the photo conductor. It is also considered to form a color image on a drum by having laser beam emitting sources corresponding to respective colors for forming a color image and emitting from these beam emitting sources to form an image of each color.

As disclosed in Japanese Patent Laid-Open Publication No. 9-189872, the image forming device having the plurality of laser beams is considered to have a common optical member such as a pair of polygon mirrors and a fθ lens for the multiple beams in order to make the device compact. In order to enter the multiple beams into one pair of polygon mirrors, it is necessary to make the intervals among the multiple beams small to synthesize into one beam in appearance.

Therefore, the multiple beams are required to be synthesized by a half mirror before entering into the polygon mirrors. For example, where two beams are synthesized into one, one of the beams is passed through the half mirror, while the other is reflected by the half mirror. Here, where the laser beam of a conventional optical device is passed through the half mirror, its power is attenuated, causing a difference in beam power between the beam reflected by the half mirror and the one passed through the half mirror even if the beam sources having the same power are used.

Accordingly, Japanese Patent Laid-Open Publication No. 9-189872 described above has the optical member disposed so to allow the respective beams to pass through the half mirror in a minimum quantity with the power loss of the beam passing through the half mirror taken into account. The number of times to pass through the half mirror is limited to zero or one time.

But, when the number of times to pass through the half mirror in order to compose the multiple beams into one is decreased, the number of times to reflect the beams by the half mirror is increased. When the number of times to reflect the beams by the half mirror is increased, influences tend to be caused due to an error in mounting the half mirror and accuracy of a housing. If the half mirror were displaced, both the incident beam and the outgoing beam are influenced by the "displacement", and the influence becomes two times larger than the actual displacement. Besides, even if the displacement at the half mirror is very small, it becomes very large on the photo conductor drum field where the beam finally reaches because there is some distance from the half mirror to the field on the photo conductor drum. Furthermore, this displacement is multiplied with the increase in the number of reflection times. Thus, the displacement between the beam passing through the half mirror and the beam reflected by the half mirror is increased, and the positions of the multiple beams on the field are largely dispersed, resulting in a disadvantage that the image is degraded.

BRIEF SUMMARY OF THE INVENTION

An object of the invention is to improve the multi beam exposure unit which has a plurality of half mirrors.

That is, the object of the present invention is to make an influence due to displacement of the half mirrors caused by a mounting error of the half mirror or a positional accuracy of the housing as small as possible. And the object of the present invention is such that the displacement in the main scanning direction on the field can be prevented and a high-quality image can be obtained.

In order to achieve the above object, according to one aspect of the present invention, there is provided a multi beam optical unit comprising:

a plurality of light emitting sources for emitting laser beams; a plurality of optical members characterized by reflecting light entering a first face and allowing incident light to penetrate a second face which is opposite to the first face; a housing in which the plurality of light emitting sources and the plurality of optical members are arranged in such a way that the plurality of laser beams emitted from the light emitting sources are composed into one beam, and the laser beams emitted from the light emitting sources are reflected not more than one time by the optical members.

Further, in order to achieve the above object, according to one aspect of the present invention, there is provided a multi beam optical unit comprising:

a first light emitting source for emitting a first beam;

a second light emitting source for emitting a second beam;

a third light emitting source for emitting a third beam;

a fourth light emitting source for emitting a fourth beam;

a first optical member for allowing the first beam to penetrate and reflecting the second beam; a second optical member for allowing the first and second beams to penetrate and reflecting the third beam; a third optical member for allowing the first, second and third beams to penetrate and reflecting the fourth beam; and a housing for supporting the first to fourth light emitting sources and the first to third optical members.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

DETAILED DESCRIPTION OF THE INVENTION

One embodiment of the invention will be described with reference to the accompanying drawings.

Figure 1:
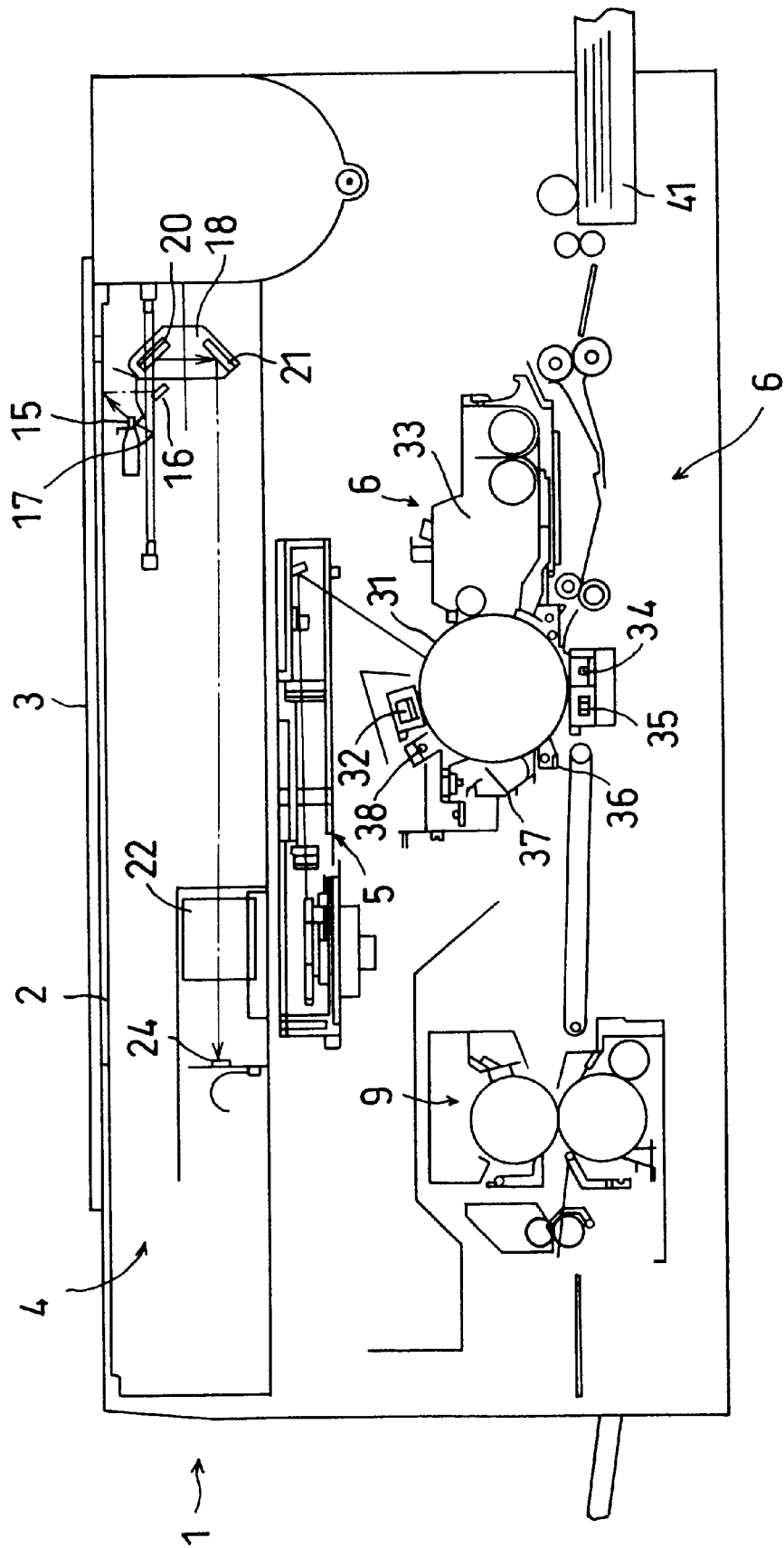
FIG. 1 is a diagram showing a schematic structure of a digital copy machine to which the present invention is applied.

FIG. 1 is a diagram showing a digital copy machine to which the multi-beam exposure unit of the invention is applied. In the drawing, reference numeral 1 is a unit body. A platen glass 2 of transparent glass on which an original is placed and an original cover 3 openable on the platen glass 2 are disposed on the top face of the unit body 1.

The unit body 1 has therein a scanner section 4 for reading an image of the original by scanning the original on the platen glass 2 while emitting light to the original, a laser optical system 5 for emitting laser beams according to information on the original image read by the scanner section 4, and an image forming section 6 which applies toner to an electrostatic latent image obtained by scanning a photo conductor drum with the laser beams generated by the laser optical system 5 to develop it, transfers the developed image to a sheet, and fixes it.

The scanner section 4 comprises a first carriage 17, a second carriage 18, and a photo receiving section having a CCD line sensor 24. The first carriage 17 has a light source 15 such as a fluorescence light for illuminating the original placed on the platen glass 2 and a first mirror 16 for reflecting the reflected light from the original and makes reciprocating movements in parallel to the platen glass 2. The second carriage 18 has second and third mirrors 20, 21 for reflecting the light which was reflected by the first mirror 16 and is moved in parallel to the platen glass 2 at a speed of ½ of that of the first carriage 17. The light reflected by the third mirror 21 of the second carriage 18 is focused by an imaging lens 22 and imaged onto CCD 24. The CCD 24 performs a photoelectric exchange of the received light and outputs an electric signal corresponding to the image of the original.

The image forming section 6 has a freely rotatable photo conductor drum 31, around which a charger 32 for electrification, a developer 33, a transfer charger 34, a release charger 35, a release pawl 36, a cleaning device 37, and a diselectrifying unit 38 are disposed in its rotating direction in this order. The electrification charger 32 charges the periphery of the photo conductor drum 31 to a predetermined electrical charge. The developer 33 develops the electrostatic latent image formed on the photo conductor drum 31 by supplying the toner. The transfer charger 34 transfers the toner image formed on the photo conductor drum 31 onto a sheet. The release charger 35 makes it easy to release the sheet on which the image is transferred from the photo conductor drum 31. The release pawl 36 releases the sheet from the photo conductor drum 31. The cleaning device 37 removes the toner remained on the photo conductor drum 31, then the diselectrifying unit 38 removes the electric charge remained on the photo conductor drum 31.

A paper feed cassette 41 accommodates a plurality of sheets therein. A sheet taken from the paper feed cassette 41 has the toner image transferred thereon at the position of the transfer charger 34 and has the toner image fixed by a fixer device 9.

Figure 2:
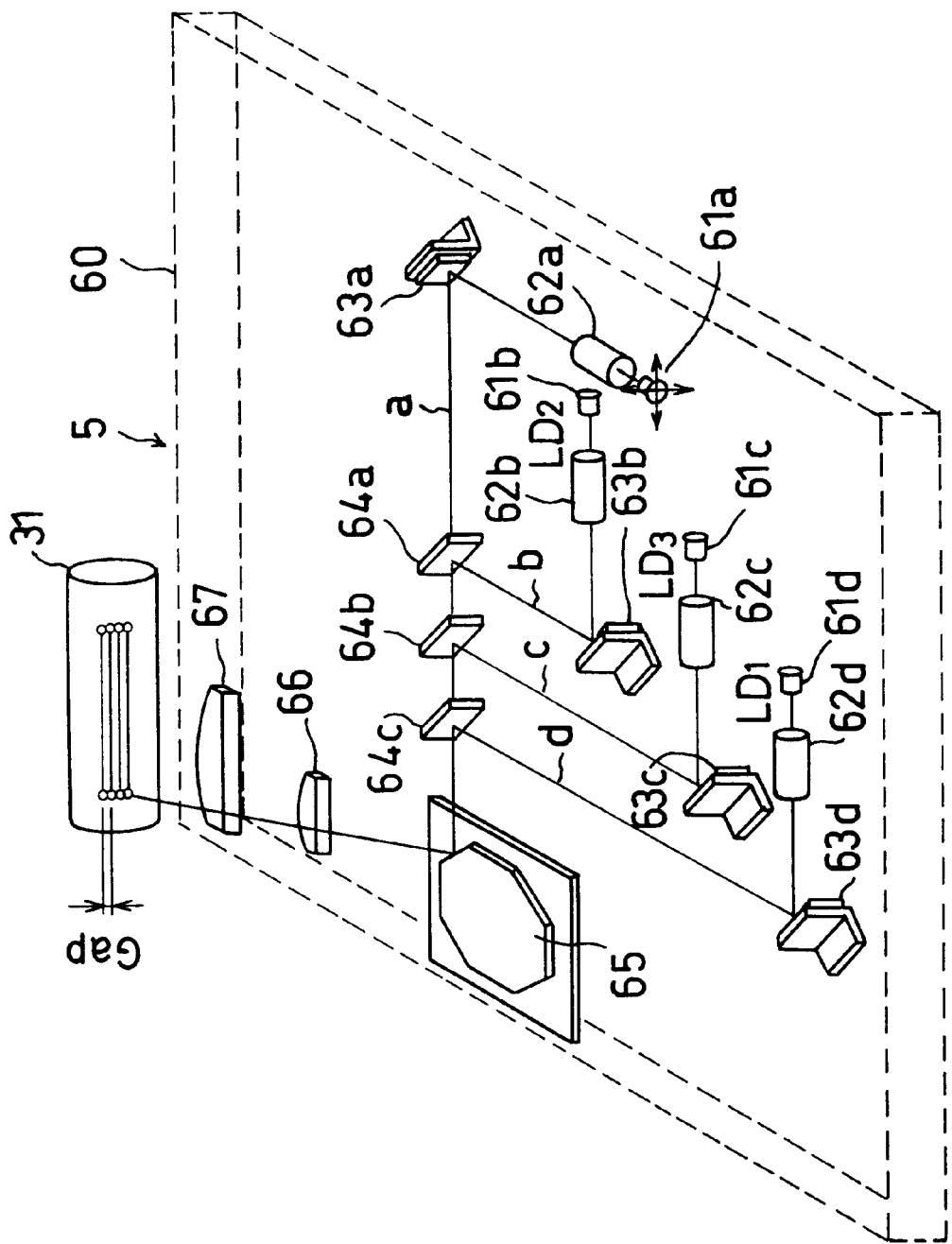
FIG. 2 is a diagram showing a schematic structure of a laser optical system to which the present invention is applied.

At the time of forming an image, the fluorescent light 15 above the first carriage 17 is turned on, the first and second carriages 17, 18 start to scan the image on the original with light, and the light reflected by the original is received by the CCD 24 and converted into an electrical signal corresponding to the image of the original. According to the obtained electrical signal, the laser optical system 5 is activated to form the electrostatic latent image corresponding to the original image on the photo conductor drum 31. As shown in FIG. 2, this embodiment is configured to scan the photo conductor drum 31 with four laser beams at the same time, so that the image can be formed at a speed of four times faster than in a case of forming the image with a single laser beam.

Figure 3:
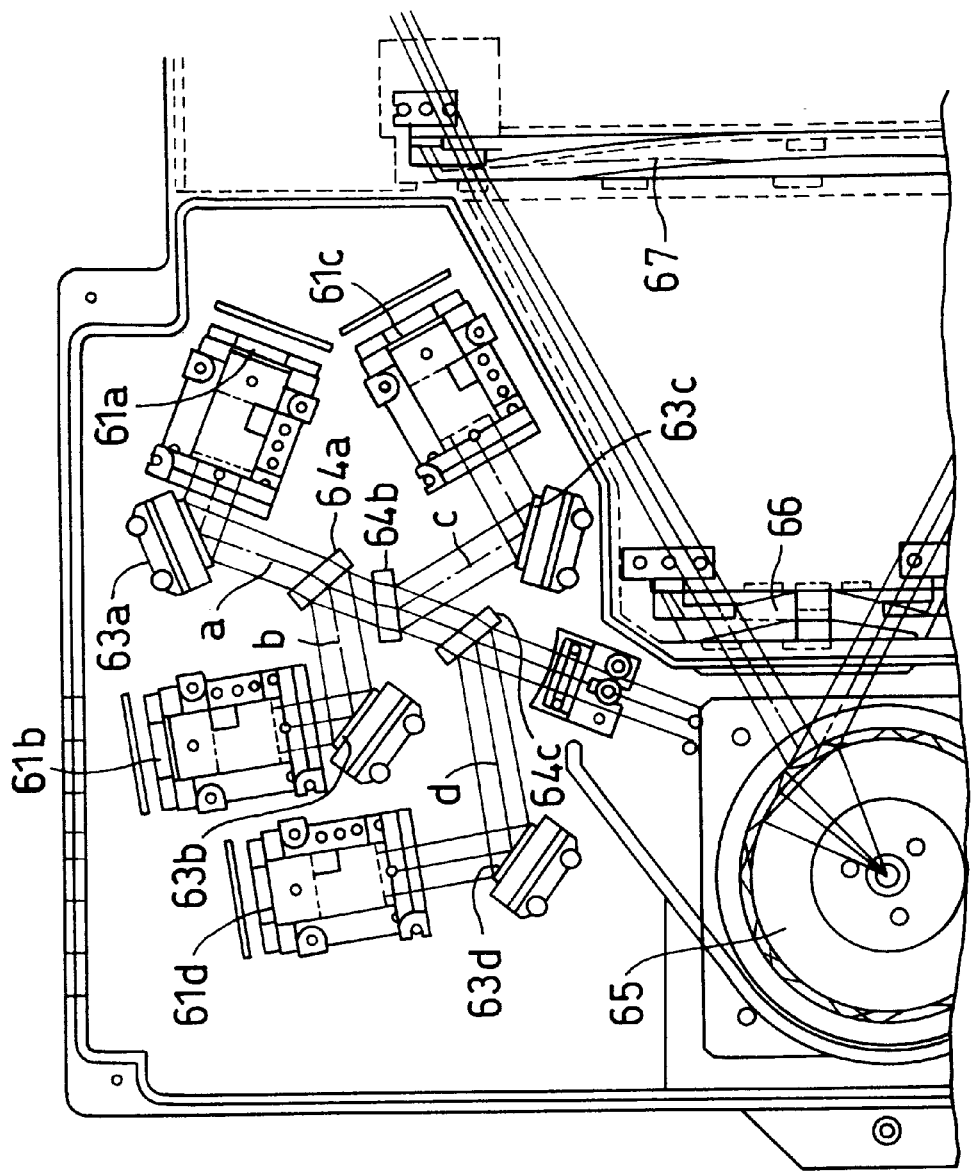
FIG. 3 is a plan view of the laser optical system to which the present invention is applied.

With reference to the schematic diagram showing the structure of the laser optical system 5 of the invention shown in FIG. 2 and the top view of the laser optical system of the invention shown in FIG. 3, its structure and operation will be described below. The laser optical system 5 has a housing 60 made of aluminum die casting or the like which has laser diodes 61a, 61b, 61c and 61d as first to fourth light emitting sources. First to fourth galvanometer mirrors 63a, 63b, 63c and 63d are disposed in directions that the laser beams are emitted from the respective laser diodes 61a, 61b, 61c and 61d. These galvanometer mirrors 63a, 63b, 63c and 63d can change an angle finely in a direction perpendicular to the scanning directions of the beams so to correct sub-scanning directions of the beams on the photo conductor drum surface reflected by the galvanometer mirrors 63a, 63b, 63c and 63d. As light composing means for composing the four beams into one, first to third half mirrors 64a, 64b and 64c are disposed substantially in a straight line along the direction that the beams are directed on the passages of the beams reflected by the galvanometer mirrors 63a, 63b, 63c and 63d. The laser beams composed into substantially one beam by the first to third half mirrors 64a, 64b and 64c enter a polygon mirror 65 as light scanning means. The polygon mirror 65 is rotated by a motor not shown and reflects the incident beams toward the photo conductor drum 31 to scan the photo conductor drum 31 with the beam light. The laser beams reflected by the polygon mirror 65 are guided to the surface of the photo conductor drum 31 through a first fθ lens 66 and a second fθ lens 67. The first and second fθ lenses 66 and 67 are characterized by eliminating the dispersion of the laser beams due to inclination of the respective mirror surfaces of the polygon mirror 65 and scanning the photo conductor drum 31 with the respective laser beams at the same speed.

To form an image on the photo conductor drum 31, an electrical signal corresponding to the image on the original is generated from the CCD sensor 24, and the first to fourth laser diodes 61a, 61b, 61c and 61d oscillates according to the electrical signal. A first laser beam a is reflected by the first galvanometer mirror 63a and guided to the polygon mirror 65 through the first to third half mirrors 64a, 64b and 64c. The number of times that the first laser beam a is reflected by the half mirror is zero. A second laser beam b is reflected by the second galvanometer mirror 63b then by the first half mirror 64a and guided to the polygon mirror 65 through the second and third half mirrors 64b and 64c. The number of times that the second laser beam b is reflected by the half mirror is one time. A third laser beam c is reflected by the third galvanometer mirror 63c then by the second half mirror 64b and guided to the polygon mirror 65 through the third half mirror 64c. The number of times that the third laser beam d is reflected by the half mirror is one time. A fourth laser beam d is reflected by the fourth galvanometer mirror 63d then by the third half mirror 64c and guided to the polygon mirror 65. The number of times that the fourth laser beam d is reflected by the half mirror is one time.

The optical axes are combined by the first to third half mirrors so to compose the laser beams into substantially one beam, which is deflected by the rotation of the polygon mirror 65 to scan the photo conductor drum 31. These four laser beams scan the photo conductor drum 31 while keeping the intervals in sub-scanning directions according to the resolution by adjusting the sub-scanning positions by the galvanometer mirrors 63a, 63b, 63c and 63d. To scan the drum with the same timing, the four laser beams are required to be positioned at substantially the same place in the main scanning direction. An adjustment of the mounted positions in the main scanning direction actually depends on the precision of components of the housing and the mounting accuracy. In the sub-scanning direction, the laser beams position on the photo conductor drum can be adjusted by the galvanometer mirrors. But the sub-scanning positions of laser beams through a first fθ lens to a second fθ lens are influenced by the precision of components of the housing and the mounting accuracy like the main-scanning direction. Therefore, a multi-beam laser unit having a large number of reflecting times by the half mirrors is largely influenced by a amounting error of the half mirrors and accuracy of the housing itself.

Figure 4:
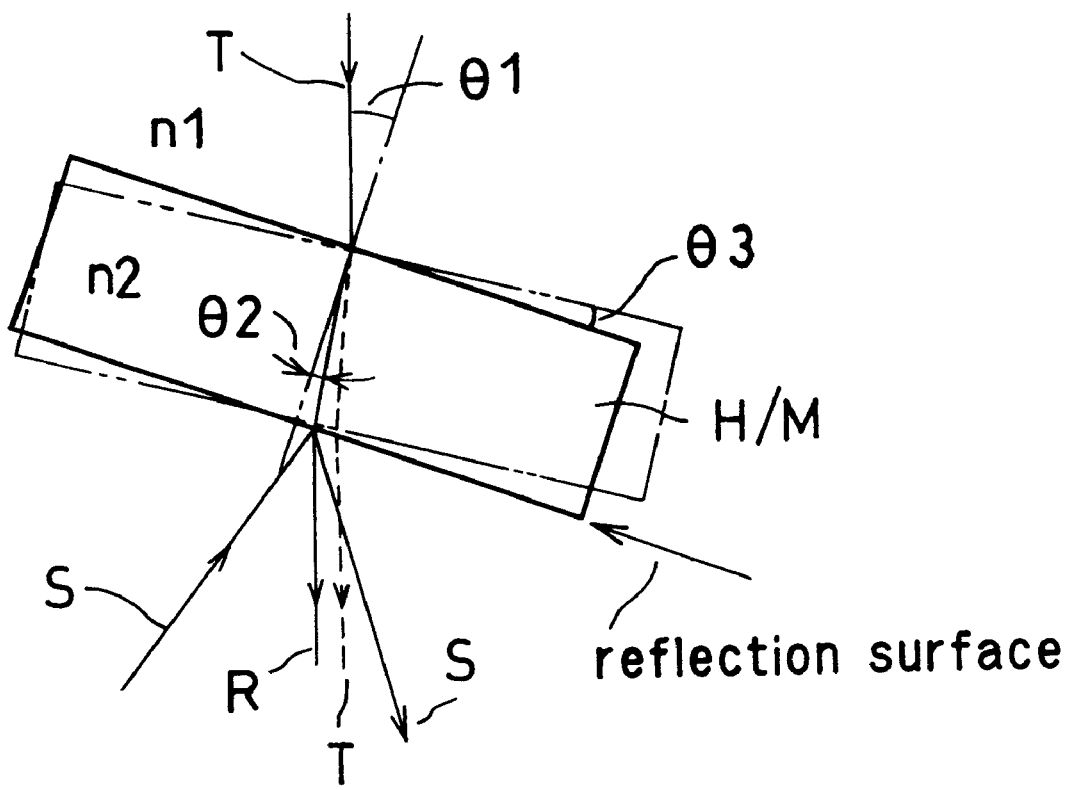
FIG. 4 is a diagram for illustrating an angle of refraction of the penetrated light and an angle of reflection of the reflected light with respect to a half mirror.

FIG. 4 is a diagram showing that a half mirror H/M is mounted to incline from the set position indicated by a solid line to an inclined position indicated by a phantom line. Referring to FIG. 4, influences of a mounting error of the half mirror upon the main scanning direction of the laser beam will be described. Here, a laser beam passing through the half mirror is T, and a laser beam reflected by the half mirror is S. In the multi-beam optical system shown in FIG. 2 and FIG. 3, the penetrated light T through the half mirror 64a corresponds to the laser beam a and the reflected light S to the laser beam b; the penetrated light T through the half mirror 64b corresponds to the laser beams a, b and the reflected light S to the laser beam c; and the penetrated light T through the half mirror 64c corresponds to the laser beams a, b, c and the reflected light S to the laser beam d. FIG. 4 shows that the half mirror is mounted displaced by θ3. When it is assumed that n1 is a refractive index with the half mirror mounted properly (indicated by the solid line), n2 is a refractive index with the half mirror displaced (indicated by the phantom line), θ1 is an incidence angle, and θ2 is an angle of refraction, an angle of refraction of the penetrated light T satisfies the conditions of the following expression.

$$n1 \cdot \sin\theta1 = n2 \cdot \sin\theta2$$

If both θ1, θ2 are very small, an influence is small because of a sin function and the penetrated light T after penetration is parallel to a theoretical optical axis R of penetration and reflection, so that the displacement on the field remains very small. But, the reflected light S is influenced by 2·θ3 as the half mirror is tilted by Theta (sub) 3. In this case, the displacement immediately after the reflection is small, but the positional displacement due to a displacement of an angle increases as the increase of the distance after reflecting becomes longer, and the displacement of the beam position on the field (on the photo conductor drum 31) becomes very large. Besides, this displacement increases further more with the increase in the number of reflection times.

On the other hand, in the multi-beam optical system of the invention, the number of times that the first laser beam a is reflected by the half mirror is zero, the number of times that the second laser beam b is reflected by the half mirror is one time, the number of times that the third laser beam c is reflected by the half mirror is one time, and the number of times that the fourth laser beam d is reflected by the half mirror is one time. Thus, the number of times that all the laser beams are reflected by the half mirror is limited to one time or below. Therefore, influences due to a mounting error of the half mirror and the housing precision in the multi-beam optical system can be made small, and a fine image quality can be retained.

The number of reflection times of each laser beam is limited to one time or below in the present invention, but the number of penetration times of each laser beam is not limited. Specifically, the number of times that the first laser beam a penetrates the half mirror is three times, the number of times that the second laser beam b penetrates the half mirror is two times, the number of times that the third laser beam d penetrates the half mirror is one time, and the number of times that the fourth laser beam d penetrates the half mirror is zero. Thus, the respective beams have a different number of times to penetrate the half mirror. In this case, a power loss is caused when the laser beam penetrates the half mirror, and when the first to fourth laser diodes 61a, 61b, 61c and 61d emit with the same beam power, the power of each beam on the photo conductor drum 31 is varied. In such a case, the power when the respective laser diodes 61a, 61b, 61c and 61d emit light is controlled so that it becomes large as the number of penetration times increases. Thus, the beam power on the photo conductor drum 31 can be made uniform. But, when the power for emitting light is made different, there are caused other problems that the service lives of the laser diodes 61a, 61b, 61c and 61d are deviated, and responses at the light emission are different.

In view of above, the first to third half mirrors 64a, b, c in this embodiment are determined to have different light transmissivity and reflectance so to have the equal beam power on the photo conductor drum 31 even if the respective laser emitting sources have the same beam power. The light transmissivity and reflectance of the first to third half mirrors 64a, 64b and 64c can be determined by the following expressions.

Assuming that the first half mirror 64a has light transmissivity T1 and reflectance R1, the second half mirror 64b has light transmissivity T2 and reflectance R2, the third half mirror 64c has light transmissivity T3 and reflectance R3, and an attenuation rate (a constant determined according to a glass material, a glass thickness, an operating wavelength and so on) while penetrating is g, the following relations are satisfied.

$$(1-g)^3 \cdot T1 \cdot T2 \cdot T3 = (1-g)^2 \cdot R1 \cdot T2 \cdot T3 = (1-g) \cdot R2 \cdot T3 = R3 \quad (1)$$

$$T1+R1+g=T2+R2+g=T3+R3+g=1 \quad (2)$$

T1, R1, T2, R2, T3, R3 are determined from the above expressions, and based on the obtained values, the first to third half mirrors 64a, b, c are produced. Then, the laser powers on the photo conductor drum 31 can be made uniform even if the number of penetration times is different.

The multi-beam optical system of this embodiment uses four beams, but the number of beams may be increased in order to increase the speed in future. And, in such a case, the expressions (1) and (2) can be generalized to the following expressions (3) and (4).

$$(1-g)^{n-1} \cdot T1 \cdot T2 \cdot T3 \ldots Tn-1 = (1-g)^{n-2} \cdot R1 \cdot T2 \cdot T3 \ldots Tn-1$$

$$= (1-g)^{n-3} \cdot R2 \cdot T3 \ldots Tn-1 = \ldots = (1-g)Rn-2 \cdot Tn-1$$

$$= Rn-1 \quad (3)$$

$$T1+R1+g=T2+R2+g= \ldots =Tn-1+Rn-1+g \quad (4)$$

By using a half mirror having light transmissivity and reflectance satisfying the above expressions, deviation of the beams on the photo conductor drum 31 can be restrained without adjusting the output of the laser diodes.

Influence of the laser power loss due to attenuation can be reduced by using material such as BK7 having a small attenuation amount as the half mirror glass material and a semiconductor laser having high power and the photo conductor drum 31 having a high sensitivity.

As described above, in the multi-beam laser optical system of this embodiment, the number of reflection times by the half mirrors is limited to one time or below in the passages of light from the laser emitting sources to the photo conductor, so that an influence due to displacement of the half mirrors caused by a mounting error of the half mirror or a positional accuracy of the housing can be made as small as possible. Thus, displacement in the main scanning direction on the field can be prevented, and a high-quality image can be obtained.

Besides, the beam powers on the field can be made uniform without differing the powers when the respective beams are emitted because the reflectance and transmissivity of the multiple half mirrors are determined in accordance with the number of penetration times and the number of reflection times of the beams. Accordingly, the service lives of the laser diodes can be prevented from being deviated, and maintainability can be improved.

What is claimed is:

1. An optical scanner using multiple half mirrors to combine multiple optical beams, comprising:

n light emitting sources for emitting laser beams, where "n" is an integer greater than 1;

(n−1) optical members having reflecting light entering a first face and allowing incident light to penetrate a second face which is opposite to the first face; and a housing in which the plurality of light emitting sources and the plurality of optical members are supported in such a way that the (n−1) optical members are arranged on substantially a linear line and the laser beams emitted from the light emitting sources are reflected not more than one time by the optical members, wherein:

the n light emitting sources are kept to have uniform output, and when the optical members have a light transmissivity Tk (where "k" is an integer, $1<k<n-1$), a reflectance Rk, and an attenuation rate while penetrating is g, the following expressions are satisfied, $$(1-g)^{n-1} \cdot T1 \cdot T2 \cdot T3 \ldots Tn-1 = (1-g)^{n-2} \cdot R1 \cdot T2 \cdot T3 \ldots Tn-1$$
   $$= (1-g)^{n-3} \cdot R2 \cdot T3 \ldots Tn-1 = \ldots = (1-g) Rn-2 \cdot Tn-1$$
   $$= Rn-1 \tag{1}$$

$$T1+R1+g=T2+R2+g= \ldots =Tn-1+Rn-1+g \tag{2}$$

2. The optical unit according to claim 1, wherein the optical members are half mirrors.

3. The optical unit according to claim 1, wherein at least one of the laser beams emitted by the n light emitting sources penetrates all the (n−1) optical members.

4. The optical unit according to claim 1, wherein at least one of the laser beams emitted by the n light emitting sources does not penetrate any one of the (n−1) optical members.

5. An optical scanner using multiple half mirrors to combine multiple optical beams, comprising:

a first light emitting source for emitting a first beam;

a second light emitting source for emitting a second beam;

a third light emitting source for emitting a third beam;

a fourth light emitting source for emitting a fourth beam;

a first optical member for allowing the first beam to penetrate and reflecting the second beam;

a second optical member for allowing the first and second beams to penetrate and reflecting the third beam;

a third optical member for allowing the first, second and third beams to penetrate and reflecting the fourth beam; and a housing for supporting the first to fourth light emitting sources and the first to third optical members, wherein:

the first to fourth light emitting sources are kept to have uniform output, and when the first optical member has light transmissivity T1 and reflectance R1, the second optical member has light transmissivity T2 and reflectance R2, the third optical member has light transmissivity T3 and reflectance R3, and an attenuation rate while penetrating is g, the following expressions are satisfied:

$$(1-g)^3 \cdot T1 \cdot T2 \cdot T3 = (1-g)^2 \cdot R1 \cdot T2 \cdot T3 = (1-g) \cdot R2 \cdot T3 = R3 \cdot \tag{1}$$

$$T1+R1+g=T2+R2+g=T3+R3+g=1 \tag{2}$$

6. The optical unit according to claim 5, wherein the first to third optical members are half mirrors.

7. The optical unit according to claim 5, wherein the housing supports the first to third optical members on substantially a linear line.

* * * * *

UNITED STATES PATENT AND TRADEMARK OFFICE
CERTIFICATE OF CORRECTION

PATENT NO. : 6,101,019
DATED : August 8, 2000
INVENTOR(S) : Hiroyuki KUNUGI.

It is certified that error appears in the above-identified patent and that said Letters Patent is hereby corrected as shown below:

Please note on front cover, [30] Foreign Application Priority Data

Jan. 22, 1998 [JP]  delete "10-9010669" and insert --10-010669--.

Signed and Sealed this

Seventeenth Day of April, 2001

Attest:

NICHOLAS P. GODICI

*Attesting Officer*   *Acting Director of the United States Patent and Trademark Office*